March 19, 1940.  J. J. CULLEN  2,194,355
ORTHOPTIC INSTRUMENT
Filed May 25, 1939
Fig. 1
Fig. 2
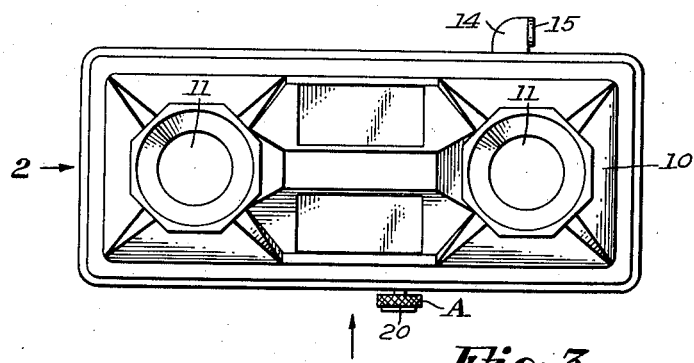
Fig. 3
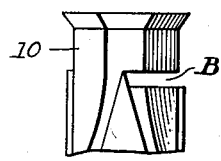
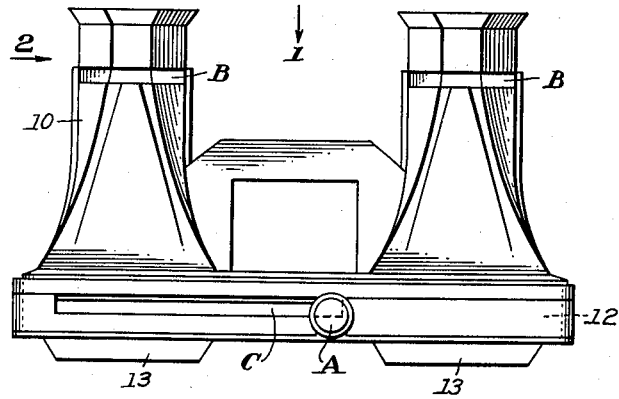
Fig. 4
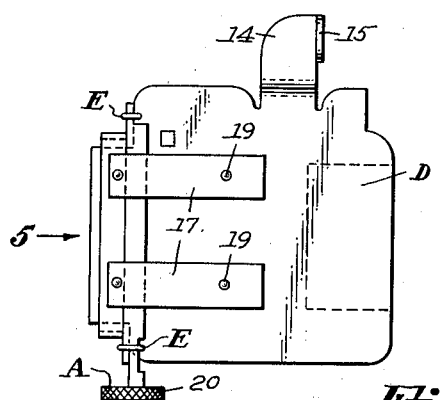
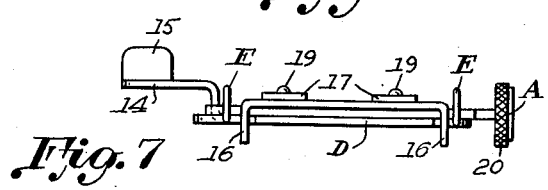
Fig. 5
Fig. 7
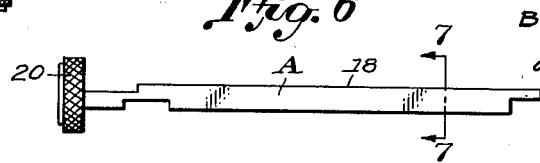
Fig. 6
Inventor:
JAMES J. CULLEN
By
Martin E Anderson
Attorney Patented Mar. 19, 1940

2,194,355

UNITED STATES PATENT OFFICE 2,194,355

ORTHOPTIC INSTRUMENT

James J. Cullen, Cheyenne, Wyo.

Application May 25, 1939, Serial No. 275,693

5 Claims. (Cl. 128—76.5)

This invention relates to improvements in orthoptic instruments.

In the treatment of the eye where the defect cannot be remedied by refraction alone, means have been used for treating the muscles so as to obtain improved coordination and focal adjustment.

It is the object of this invention to produce a simple instrument that is admirably adapted for home treatment under the guidance of a trained oculist and by means of which the muscles of the eyes can be exercised in such a way as to improve the vision.

It is not the intention to go into great detail concerning the method of treatment, but in order to make the invention and the objects thereof more readily apparent the following explanation will be made.

If a person had one eye only the problem of coordination would not arise, but with two eyes it is evident that the two eyes must move in unison and in such a way that they will be focused on the same object. If the eyes are not naturally so adjusted and related that this takes place automatically, it must be remedied either by training the muscles or by means of prisms. It is also essential that the focal adjustments must be alike and if they are not then such defects must be remedied either by use of lenses or by properly prescribed muscular exercises.

The method pursued in this case is to alternately subject the muscles to strains and to relaxation by means of the instrument that forms the subject of this invention and which will presently be described.

The instrument which will be employed for the purpose of illustration is a modification of an optical instrument which is being marketed under the trade name of TRU—VUE and which functions in the manner of an ordinary stereoscope but employs films instead of the usual mounted photographs.

In order to more clearly describe the invention, reference will now be had to the accompanying drawing in which it has been illustrated, and in which:

Figure 1 is an end view looking in the direction of arrow 1, in Figure 3;

Figure 2 is a fragmentary side elevation looking in the direction of arrows 2, in Figures 1 and 3;

Figure 3 is a side elevation looking in the direction of arrow 3, in Figure 1;

Figure 4 is a plan view of a slide which can be moved into position to entirely cut off the light for either eye and into a neutral position for binocular vision;

Figure 5 is an end view looking in the direction of arrow 5, in Figure 4; and

Figure 6 is a plan view of a rotatable wedge, a cross section of the rotatable wedge being shown at the right and marked "SEC".

In the drawing reference numerals 10 designate two parallel sight tubes, each of which is provided with a lens or eye piece 11. The tubes 10 are downwardly flaring when viewed as in Figure 3 and open into an elongated chamber 12 that communicates with the outside through slot C.

The instrument, TRU—VUE, of which this is a modification, is adapted for use with films and at the ends of chamber 12 are slits through which the film passes.

A rectangular metal plate D is mounted for longitudinal movement in chamber 12. Plate D has a projection 14 that extends through a slot C on the other side from that shown in Figure 3 or at the top when viewed as in Figure 1. Projection 14 has a portion bent sideways to form a flat finger grip 15. Plate D is provided with two pawls 16 that are secured to the plate by springs 17. The purpose of pawls 16 is to engage in sprocket openings in a film to move it in one direction. For the purpose here contemplated the pawls 16 are needed only a part of the time and means has therefore been provided for moving them to inoperative position and for holding them in such position as long as may be desired. For the purpose of rendering pawls inoperative and operative at will, a rotatable wedge 18 has been inserted between plate D and springs 17 in such a way that its sharp edge extends inwardly towards rivets 19. Wedge 18 extends to the outside, through slot C and is provided at its outer end with a knurled head 20. A spring is usually provided for holding the plate D in the position indicated by 14 and 20, but this is not essential.

The size of plate D is such that when it is positioned midway between the tubes, it will offer no obstruction to either. When it is moved to either extreme position, it completely cuts off all light through the corresponding tube.

Attention is called to the notches or openings B in the upper sides of the tube walls. These openings are for the reception of lenses used during the treatment.

The film employed may be the ordinary stereoscopic films sold for use with TRU—VUE stereoscopes.

The instrument is employed in the following manner: A film is first put into position so that when seen binocularly, it will be viewed stereoscopically. The slide is now moved to one end and a lens is inserted in the opening B. The type of lens is prescribed by the oculist and it may be a plus or minus sphere or cylinder or a prism. If the slide is now moved back to its intermediate position, there will be binocular vision, but one eye will be strained. In this way the muscles can be exercised, strained and relaxed so as to strengthen them or modify their action to obtain the desired correction.

Having described the invention what is claimed as new is:

1. An orthoptic instrument, comprising in combination, two interconnected sight tubes arranged for binocular vision, an optical lens in one end of each tube, forming an eye piece, a removable closure for the other ends of the tubes, said closure having an opening in alignment with each tube, a transversely movable slide positioned between the end closure and the tubes, means for moving the slide to position it alternately across the light path of each tube, the width of the slide being substantially equal to the distance between the openings in the closure, whereby when the slide is in a central position, both openings will be wholly unobstructed.

2. An orthoptic instrument, comprising in combination, two interconnected sight tubes arranged for binocular vision, an optical lens in one end of each tube, forming an eye piece, a removable closure for the other ends of the tubes, said closure having an opening in alignment with each tube, there being a passage adjacent the inner surface for the reception of a film having stereoptic pictures thereon spaced to register with the openings, a slide positioned between the film passage and the ends of the tube, the slide having a width substantially equal to the distance between the openings in the closure, and means accessible from the outside for moving the slide to alternately open and close each sight tube and for holding it in inoperative position between the openings.

3. An orthoptic instrument comprising, in combination two interconnected sight tubes arranged for binocular vision, an optical lens in one end of each tube forming an eye piece, a removable closure for the other end, each tube having its wall provided with a lateral opening adjacent each lens for interchangeably supporting corrective lenses, the closure having an opening in alignment with each sight tube, and a slide movably mounted between the end closure and the tubes for alternately closing and opening the passages through the tubes, the slide having a width substantially equal to the distance between the openings in the closure, and means for moving the slide and for holding it in an intermediate position.

4. An orthoptic instrument, comprising, in combination, two interconnected sight tubes arranged for binocular vision, an optical lens in one end of each tube, forming an eye piece, a removable closure for the other ends of the tubes, said closure having an opening in alignment with each tube, there being a passage between the closure and the ends of the tube for the reception of a film having sprocket openings along its edges, a slide positioned adjacent one side of the film and mounted for transverse movement, the slide having a width substantially equal to the distance between the openings in the closure, means accessible from the outside for moving the slide to alternately open and close the openings, ratchet pawls carried by the slide for engaging the sprocket openings for moving the film in one direction while the slide is reciprocated, and means accessible from the outside for moving the pawls to inoperative position and for holding them in such position.

5. An orthoptic instrument comprising a body having two spaced tubular members arranged for binocular vision, one end of each tubular member having lenses and the other end a closure having sight openings in alignment with each tube, an opening between the closure and the lens for the reception of a transparent film having images thereon, an opaque plate slidably mounted between the lenses and the film, the plate being movable to alternately open and close the light passages in the tubes whereby the images can be viewed with either eye, the opaque plate, when in a position corresponding to the center of its movement, leaving both light passages open, whereby the images can be seen with both eyes, the body having an opening and a handle extending through the opening for moving the opaque plate.

JAMES J. CULLEN.